United States Patent [19]

Moertel

[11] 4,045,846
[45] Sept. 6, 1977

[54] FOLDED TAPE SLIDE FASTENER STRINGER WITH EXTERNAL CORD

[75] Inventor: George B. Moertel, Conneautville, Pa.

[73] Assignee: Textron, Inc., Providence, R.I.

[21] Appl. No.: 706,351

[22] Filed: July 19, 1976

Related U.S. Application Data

[63] Continuation-in-part of Ser. No. 648,428, Jan. 12, 1976, and a continuation-in-part of Ser. No. 539,642, Jan. 9, 1975, Pat. No. 3,975,802.

[51] Int. Cl.² .................. A44B 19/40; A44B 19/12
[52] U.S. Cl. ............................................ 24/205.16 C
[58] Field of Search ............... 24/205.16 C, 205.1 C, 24/205.16 D

[56] References Cited

U.S. PATENT DOCUMENTS

| 3,283,379 | 11/1966 | Burbank | 24/205.1 C |
|---|---|---|---|
| 3,409,952 | 11/1968 | Uhrig | 24/205.1 C |

Primary Examiner—Bernard A. Gelak
Attorney, Agent, or Firm—O'Brien & Marks

[57] ABSTRACT

One or more external cords are secured to the outside of a folded support tape alongside a bead formed in the folded edge of the tape by interconnecting portions of a continuous coupling element passing through strap portions of the tape defined by slits over the folded edge.

9 Claims, 9 Drawing Figures

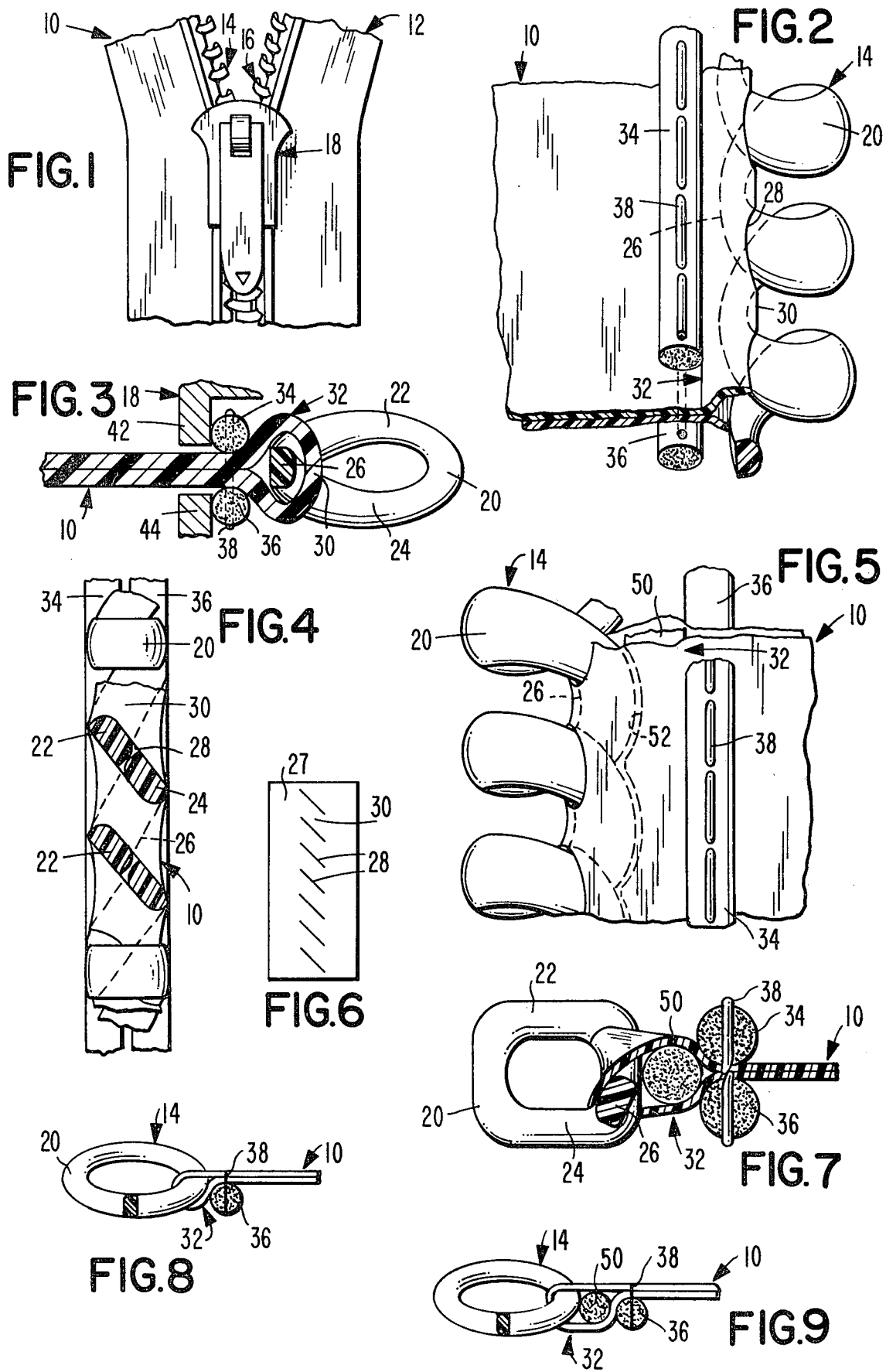

FOLDED TAPE SLIDE FASTENER STRINGER WITH EXTERNAL CORD

CROSS REFERENCE TO RELATED APPLICATIONS

This application is a continuation-in-part of my prior copending applications Ser. No. 539,642 filed on Jan. 9, 1975, now U.S. Pat. No. 3,975,802 and Ser. No. 648,428 filed Jan. 12, 1976 which are incorporated herein by reference.

BACKGROUND OF THE INVENTION

1. Field of the Invention

This invention relates to slide fasteners having stringers formed from a continuous coupling element secured within a folded edge of a support member or tape with head portions of the continuous coupling element extending from openings in the folded edge.

2. Description of the Prior Art

In commercially available slide fastener stringers utilizing a continuous coupling element such as a spiral coupling element secured to one edge of a carrier or support tape, the continuous coupling element is usually secured to the edge of the tape by sewing or by weaving the coupling element to the tape. The prior art, as exemplified in U.S. Pat. Nos. 1,557,303, 1,609,487, 1,933,290, 1,937,297, 2,018,099, 2,296,880, 3,430,304 and 3,517,422 and French Pat. No. 1,135,269, discloses a number of slide fasteners having continuous coupling elements secured within a fold of a support member wherein head portions of the coupling element extend from slots across the folded edge of the support member. Additionally, French Pat. No. 452,527 discloses a fastener with a spiral secured by strips of material formed at an angle across a folded edge of a strip. The commercial employment of slide fasteners with continuous coupling elements secured in a fold of a tape has not been significant compared to fasteners wherein the coupling elements are woven or sewn to textile tapes despite the obvious cost advantage of low cost strips such as synthetic polymer or paper strips compared to woven textile tapes. This failure can be attributed to deficiencies in the prior art, such as breakage or tearing of the strap portions of the support member folded over the coupling elements, inferior support or instability for the coupling element, inability to withstand high slider forces, excessive difficulty in slider operation, etc., Various other types of slide fasteners have been disclosed as including bead cords secured to a tape adjacent a coil fastener element, such as in U.S. Pat. Nos. 2,497,821, 2,942,338 and 3,002,245; or as including various other cords, braids or strips secured together with continuous coupling elements to tapes, such as in U.S. Pat. No. 3,015,868 and No. Re. 26,086.

SUMMARY OF THE INVENTION

The invention is summarized in a stringer for a slide fastener including a support tape formed from a longitudinally folded strip defining a folded edge and having opposite folded portions which extend from the folded edge and are secured together, the support tape having a plurality of spaced slits formed in the strip transversely over the folded edge and defining strap portions extending over the folded edge between the slits, a continuous coupling element having a plurality of successive sections each including a head portion extending from a respective slit of the plurality of slits and including an interconnecting portion which is joined with an adjoining section and extends within the folded edge beneath a respective one of the strap portions, the continuous coupling element having a thickness to form a bead in the folded edge of the tape, and cord means secured to the outside of the support tape and extending longitudinally alongside the bead to form a slider flange bearing member.

An object of the invention is to construct a low cost and reliable slide fastener having a folded carrier tape securing a continuous coupling element with reduced tendency for tearing securing strap portions.

Another object of the invention is to provide for easier operation of a slider in a slide fastener employing a continuous coupling secured within a fold of a support member.

It is also an object of the invention to increase the endurance of folded tape slide fasteners.

An advantage of the invention is that cord means on the outside of a folded support member along a bead formed by the fold over the coupling element greatly improves the ability to withstand high slider loadings as well as increasing the ease of operation and the endurance of the slide fastener.

A further feature of the invention is the incorporation of both external cord means and internal cord means, the latter abutting the coupling element.

A still further feature of the invention is the employment of a spiral coupling element formed from a filament with an oblong cross section which, at leg portions exiting from slits formed at an oblique angle in the folded tape edge, is aligned in the longest dimension with the slit and the other leg portion.

Other objects, advantages and features of the invention will be apparent from the following description of the preferred embodiment taken in conjunction with the accompanying drawings.

BRIEF DESCRIPTION OF THE DRAWINGS

FIG. 1 is a partial plan view of a slide fastener in accordance with the invention.

FIG. 2 is an enlarged plan view of a portion of one stringer broken away from the slide fastener of FIG. 1.

FIG. 3 is a cross section view of the stringer portion of FIG. 2.

FIG. 4 is a side view with parts broken away of the stringer portion of FIGS. 2 and 3.

FIG. 5 is a view similar to FIG. 2 of a stringer portion of a modified slide fastener in accordance with the invention.

FIG. 6 is a plan view of an unfolded strip for forming the folded tapes in the fasteners.

FIG. 7 is a cross section view of the modified stringer portion of FIG. 5.

FIG. 8 is a cross section view of another modified stringer portion in accordance with the invention.

FIG. 9 is a cross section view of still another modified string portion of a slide fastener in accordance with the invention.

DESCRIPTION OF THE PREFERRED EMBODIMENTS

As illustrated in FIG. 1, the invention is embodied in a slide fastener having planarly disposed support members such as tapes indicated generally at 10 and 12 and having continuous coupling elements such as spiral coupling elements indicated generally at 14 and 16 along with a slider indicated generally at 18 which is is slidable along the coupling elements 14 and 16 for opening and closing the slide fastener. The tape 10 and the coupling element 14, as viewed in FIG. 1, form a left stringer while the tape 12 and the coupling element 16 form a right stringer. The right stringer is substantially a mirror image of the left stringer.

The spiral coupling elements 14 and 16 are formed into successive convolutions or sections from a continuous filament, such as a nylon or polyester filament, which has an oblong cross section, such as a D-shaped cross section. As shown in FIG. 2 and 3 each convolution of the coupling element 14 includes a head portion 20, an upper leg portion 22 extending from the upper side of the head portion 20, a lower leg portion 24 extending from the lower side of the head portion 20, and a connecting or heel portion 26 interconnecting the lower leg portion 24 to the upper leg portion of an adjoining convolution.

The tape 10 is formed from a strip 27, FIG. 6, which has a longitudinal row of transverse slits 28 formed in an intermediate section thereof to define strap portions 30 extending between opposite strip portions or halves of the strip. As shown in FIGS. 2–4, the strip is longitudinally folded along the row of transverse slits with the coupling elements 14 assembled inside of the fold such that the head portions 20 and the leg portions 22 and 24 protrude from the respective slits 28 with the interconnecting portions 26 extending within the fold beneath the strap portions 30. The opposite portions or halves of the folded strip are secured together by suitable means, such as adhesive, ultrasonic or thermal bonding to secure the coupling element 14 in the folded edge of the support member 10. The strip 27 forming the tape 10 is preferably a low cost material such as a synthetic polymer resin, paper or the like.

The slits 28 are formed in an oblique angle to the folded edge of the tape 10 so that the leg portions 22 and 24 of each section extend into opposite halves of the respective slit 28 at points spaced longitudinally along the folded edge of the tape 10. The monofilament forming the spiral coupling element 14 is twisted such that the longest dimensions of the oblong cross sections of each pair of leg portions 22 and 24 are substantially aligned with each other and with the slits 28 where the leg portions 22 and 24 exit from the slits 28. The strap portions 30 are substantially wider than the slits 28 and extend generally perpendicular to the interconnecting portions 26.

As shown in FIG. 3, the thickness of the monofilament forming the coupling element particularly within the interconnecting portions 26 is substantially greater than the thickness of the material forming the tape 10 to produce a substantial bead indicated generally at 32 in the folded edge of the tape 10. Cord means, such as a pair of textile cords 34 and 36 or the like, extends longitudinally on the outside of the tape 10 alongside and in engagement with the bead 32. The textile cords 34 and 36 are illustrated as being secured to the outside of the tape 10 by stitches 38. Other means of securing the textile cords 34 and 36 to the tape may be used such as adhesive, mechanical, or other bonding means; also an overedge stitch may be used as an alternative to the illustrated straight stitch. Where a pair of cords 34 and 36 are employed on opposite sides of the folded tape 10 as shown in FIG. 3, the thickness of the combined cords 34 and 36 with the tape therebetween is selected to be generally about equal to the thickness of the bead 32 and the coupling element 14.

The cords 34 and 36 provide a bearing surface for flanges 42 and 44 of the slider 18 and protect the sheet material forming the bead 32 in the tape 10 from wear due to engagement by the slider flanges 42 and 44. Additionally the textile cords 34 and 36 provide a smoother and more compliant surface for the slider flanges rendering operation of the slider 18 easier. Also the cords 34 and 36 distribute slider stress over a substantial area of the bead 32 to reduce point stress, such as occurs where the filament engages the tape. Thus, the cords 34 and 36 render possible the manufacture and construction of a slide fastener employing folded synthetic polymer tapes with greatly increased wearability and durability as well as the ability to withstand relatively large crosswise stress from slider operations.

The cords 34 and 36 in conjunction with the wide strap portion 30, the oblique angle of the slits 28 over the folded edge of the tape 10, and the aligned longitudinal dimensions of the cross sections of the leg portions with the slit, result in generally the full strength of the strip 27 securing the interconnecting portions 26; the tendency of the strap portions 30 to fail near the ends of the slits 28 or where the leg portions 22 and 24 exit therefrom is reduced by the distribution of forces by the cords 34 and 36.

In the modification shown in FIGS. 5 and 7, a cord 50 is disposed within the folded edge of the tape 10 engaging the outside curvatures of the interconnecting portions 26. Preferably the cord 50 is formed from a resilient material such as a textile thus forming suitable seats 52 for the heel portions 26. The cord 50 adds to the stability of the couling element 14 and allows the strap portions 30 to more securely hold the heel portions 26 to the tape 10 due to the resilience of the cord 50.

As illustrated in FIG. 8, another modification of the stringer is the use of a single external cord 36 on only one side of the tape with the planar portion of the tape 10 being offset with respect to the bead 32 and the coupling element 14. In FIG. 9, still another modification of the stringer includes the internal cord 50 together with the single external cord 36 and the offset planar portion of the tape 10. The asymmetrical version of the stringer would be used with a slider having only flanges on one wing thereof to engage the external cords, the opposite side of the tape presenting a smooth surface.

Since many variations, modifications, and changes in detail may be made to the described embodiment it is intended that all matter in the foregoing description and shown in the accompanying drawings shall be interpreted as illustrative and not in a limiting sense.

What is claimed is:

1. A stringer for a slide fastener comprising
a support tape formed from a longitudinally folded strip defining a folded edge and having opposite folded portions which extend from the folded edge and are secured together,
said support tape having a plurality of spaced slits formed in the strip transversely over the folded edge and defining strap portions extending over the folded edge between the slits,
a continuous coupling element having a plurality of successive sections each including a head portion extending from a respective slit of the plurality of slits and including an interconnecting portion which is joined with an adjoining section and extends within the folded edge beneath a respective one of the strap portions, said continuous coupling element having a thickness to form a bead in the folded edge of the tape, and cord means secured to the outside of the support tape and extending longitudinally alongside the bead to form a slider flange bearing member.

2. A stringer for a slide fastener as claimed in claim 1 wherein the support tape is formed from a folded strip of synthetic polymer resin.

3. A stringer for a slide fastener as claimed in claim 1 wherein the coupling element is a spiral coupling element formed from a continuous filament and includes a pair of leg portions in each section extending from opposite sides of the head portions into the slits, the looped strap portions have a width substantially greater than the width of the slits, and the slits are formed in the support member at an oblique angle to the folded edge such that opposite halves of each slit receive the respective leg portions of each pair of leg portions at respective longitudinally spaced points on the folded edge of the tape.

4. A stringer for a slide fastener as claimed in claim 3 wherein the continuous filament has an oblong cross section with the longest dimensions thereof in each pair of leg portions aligned with each other and the respective slit where the leg portions exit from the slit.

5. A stringer for a slide fastener as claimed in claim 1 including a cord extending longitudinally within the folded edge of the support tape between the opposite folded portions of the tape and secured in engagement with external surfaces of the interconnecting portions of the continuous coupling element.

6. A stringer for a slide fastener as claimed in claim 5 wherein the coupling element is a spiral coupling element formed from a continuous filament into successive convolutions, and the cord is a resilient cord which is deformed about the interconnecting portions of the spiral coupling element to form seats therefor.

7. A stringer for a slide fastener as claimed in claim 1 wherein the cord means is a pair of cords secured on opposite sides of the tape.

8. A stringer for a slide fastener as claimed in claim 1 wherein the cord means is a single cord secured to one side of the tape with the planar portion of the tape being offset from the coupling element and the folded edge of the tape over the interconnecting portions.

9. A stringer for a slide fastener as claimed in claim 1 wherein the opposite folded portions of the strip are secured together by a threadless bond.

* * * * *